United States Patent [19]

Helfert et al.

[11] 4,061,684

[45] Dec. 6, 1977

[54] HIGHLY BRANCHED POLYETHER POLYOLS OF HIGH MOLECULAR WEIGHT

[75] Inventors: Herbert Helfert, Frankenthal, Germany; William Keith Langdon, Grosse Ile; Pauls Davis, Gibraltar, both of Mich.

[73] Assignee: BASF Wyandotte Corporation, Wyandotte, Mich.

[21] Appl. No.: 736,939

[22] Filed: Oct. 29, 1976

[51] Int. Cl.² .................. C07C 43/00; C10M 7/16
[52] U.S. Cl. .................. 260/615 B; 260/2 A; 260/2 BP; 260/2 EP; 252/52 A; 252/73; 252/316; 536/170
[58] Field of Search ............ 260/615 B, 2 R, 2 EP, 260/2 BP, 2 A

[56] References Cited

U.S. PATENT DOCUMENTS 2,724,716  11/1955  Dickey et al. .............. 260/615 B

OTHER PUBLICATIONS

Foldi, Ber 53 (1920) 1839–1843.

*Primary Examiner*—Howard T. Mars
*Attorney, Agent, or Firm*—John W. Linkhauer; Bernhard R. Swick; Robert E. Dunn

[57] ABSTRACT

Highly branched polyether polyols of high molecular weight (such as over 12,000) are made by coupling an alkoxylated polyglycerol, by reaction of the sodium alcoholate of the oxyalkylated polyglycerol with a dibenzenesulfo or ditoluenesulfo ester of a diol containing 2 to 6 carbon atoms. Products obtained are viscous resinous products which are particularly suitable for use as hydrophilic water-swellable gels and other purposes.

5 Claims, No Drawings

HIGHLY BRANCHED POLYETHER POLYOLS OF HIGH MOLECULAR WEIGHT

BACKGROUND OF THE INVENTION

1. Field of the Invention

This invention relates to the making of polyether polyol compositions, and in particular, to the making of such compositions which are highly branched and have a relatively high molecular weight, such as approximately 12,000 or greater. Still more particularly, it relates to derivatives of polyglycerol having a highly branched structure and high molecular weight.

2. Description of the Prior Art

It may be taken as known, for example, from U.S. Pat. No. 3,636,774, that glycerol may be polymerized to form polyglycerol. It is known, for example, from U.S. Pat. No. 3,932,532, that the active hydrogen atoms of polyglycerol can be reacted with alkylene oxides to form polyglycerol ethers. Moreover, those skilled in the art will appreciate that it is possible to add several mols of ethylene oxide or propylene oxide per active OH group present in the polyglycerol. The addition of one mol of ethylene oxide or propylene oxide at one of the hydroxyl groups of the polyglycerol leaves an oxyethylene or oxypropylene group attached to the polyglycerol, to form a polyglycerol ether, but the added group itself terminates in an active hydrogen atom, which is capable of reacting with additional ethylene oxide or propylene oxide.

It has been found, however, that there are limits to the extent to which ethylene and/or propylene oxide may be added to, for example, a polyglycerol of 5 to 30 glycerol units. The reaction of a material which contains an active hydrogen atom with ethylene oxide to produce an oxyethylated material of high molecular weight usually proceeds quite smoothly under proper conditions of catalysis, temperature, and pressure and with adequate mixing, but there is a problem in the oxyethylation of a polyglycerol of 6 to 30 glycerol units, namely, that it is not convenient to attempt to produce from the polyglycerol in one step or stage a highly oxyethylated product; materials of relatively high molecular weight are involved, and it is difficult to ensure that the relatively minor proportion of polyglycerol material is adequately stirred into and properly mixed and reacted with the ethylene oxide. Better results are obtained, without the use of an autoclave of relatively great size, if the reaction is conducted in a number of steps or stages, such as 2 to 4, with the polyglycerol or alkoxylated polyglycerol being in each stage reacted with about 4 to 10 times as much by weight of ethylene oxide. Even for the further consideration discussed below, the use of propylene oxide in place of ethylene oxide raises just the same problems.

Still another consideration is that with long chains of oxypropylene units, there is the additional possibility of obtaining a "transfer" reaction in place of the desired chain-growing or "propagation" reaction. The "transfer" reaction creates an allyl-alcohol entity which is relatively more reactive than the polymer, and it or oxypropylated polymers derived from it, compete with increasing success for the available unreacted propylene oxide. See, for example, "Polyethers" by C. C. Price, *Accounts of Chemical Research,* Vol. 7, p. 294 at 295 (1974).

It may also be taken as known that a material containing an active OH group will react with a benzene sulfonyl ester or toluene sulfonyl ester to form a coupled compound, with the benzene sulfonate or toluene sulfonate serving as a "leaving group". For example, it is known from an article of Z. Földi, *Berichte,* Vol. 53, 1839 et seq. (1920), that for the alkylation of phenols, esters of benzenesulfonic acid may be used. It is also true that the benzenesulfonic acid diester of ethylene glycol is known as a compound, for example, from an article by Földi in *Berichte,* Vol. 60, p. 660 (1927). It has not, however, been obvious to those of ordinary skill in the art that the latter compound can be brought into reactive relationship with an oxyalkylated polyglycerol compound, serving to convert it to a coupled, highly branched, nonionic product of high molecular weight, a material suited for uses that the materials of lower molecular weight, made merely by the oxyalkylation of polyglycerol, serve less adequately or not at all.

SUMMARY OF THE INVENTION

In accordance with the invention, the deficiencies of the prior art are overcome with the use of a suitable coupling agent, such as the benzenesulfonic acid diester of ethylene glycol. Similar esters of other diols containing 2 to 6 carbon atoms may likewise be used. Such a coupling agent reacts, under relatively mild conditions, with the alcoholate of a polyglycerol polyol, or with the polyglycerol polyol itself, to yield a product of advanced molecular weight. Depending upon the polyglycerol polyol selected, its degree of polymerization, and the extent of coupling effected, a variety of products of high molecular weight, ranging from water-soluble materials through various gels and gums and into the region of resinous solids, can be produced readily.

DESCRIPTION OF THE PREFERRED EMBODIMENTS

A first step in the making of the highly branched polyether polyols of high molecular weight, in accordance with the present invention, is the making of the alkoxylated polyglycerol starting material. The alkoxylated polyglycerol starting material is more particularly described in a copending application, filed of even date herewith. The starting material is itself a polyether polyol of high molecular weight. It is made by condensing glycerol to form a polyglycerol containing about 5 to 20 glycerol units, and then oxyalkylating the resulting polyglycerol, with ethylene oxide, propylene oxide, or butylene oxide, to a very substantial extent, such as the addition of 30 to 80 oxyalkylene units, on the average, onto each of the available hydroxyl groups of the polyglycerol.

To be more precise, the starting material may be defined as in the above-mentioned application: a mixture of compounds having the formula

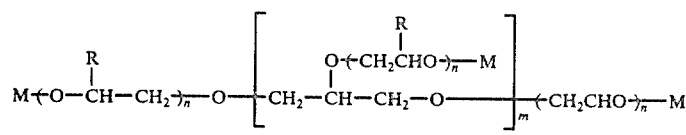

where R is hydrogen or a methyl group and in which at least 75% of the R groups are hydrogen, M is hydrogen or an alkali metal, $m$ is an integer having an average value greater than 5, and $n$ is an integer having an average value high enough to provide a compound mixture having greater than 95% alkylene oxide moieties and preferably more than 99% alkylene oxide moieties.

As has been indicated above, it is usually desirable to proceed by conducting the reaction in a number of steps or stages, limiting the proportion of alkylene oxide used in each step to an amount on the order of three to eight times as great as the weight of the material containing glycerol units. By proceeding in this way, it is possible to make a polyglycerol-based material of high molecular weight, over 12,000, and in some instances as high as 50,000. There is thus obtained a material containing, in effect, over 100 or 200 times as much alkylene oxide as polyglycerol. The molecular weight that can be achieved appears to be dependent upon the proportion of alkaline catalyst used, with smaller proportions of alkaline catalyst making it possible to achieve higher molecular weight and, as a consequence, improved thickening power per unit weight of product. On the other hand, the extent to which it is possible to add oxyalkylene units at a given stage in the process of making the starting material is dependent upon the proportion of alkaline catalyst used; if too little is used, the rate of reaction tends to be reduced to an undesirable extent.

There is the consideration, moreover, that as one stage follows another, and the molecular weight of the material being worked with increases, it becomes necessary to use increasingly higher temperatures, in order to maintain the glycerol-containing material in liquid and reactive form. As a practical matter, by using three stages of reaction, with six parts by weight of alkylene oxide added per 1 part by weight of glycerol or glycerol-containing material in each of three stages, there may be obtained a product which is suitable for use as a starting material in accordance with the present invention.

In order to reproduce a product which has particular desired characteristics and properties, it may be important to be sure to use a polyglycerol which is within some reasonably close tolerance of having a predetermined average number of glycerol units, such as six plus or minus one, or seventeen plus or minus two, and to oxyalkylate it to a predetermined degree, again within some reasonable tolerance limits. In respect, however, to whether there is being used the general idea of the instant invention, that is, the concept of solving the problem of making conveniently a highly branched oxyalkylated (mostly oxyethylated) polyol of substantial molecular weight (usually over 12,000), using the coupling practice taught herein, the precise degree of polymerization of the polyglycerol and the precise extent of the oxyalkylation which is conducted, before the final coupling step, are not particularly important, so long as the limits indicated herein with respect thereto are also at the same time observed. It is considered important that the polyglycerol contain an average of over 5 glycerol units in order to obtain a final product of desired molecular weight and other properties, and it is important to oxyalkylate with ethylene oxide or a mixture which provides for at least 75% of oxyethylene moieties, to avoid working with the materials of relatively lower molecular weight which result, owing to the transfer reaction mentioned above, when a greater proportion of propylene oxide or some other higher alkylene oxide is used with the ethylene oxide.

According to the present invention, a material of the particular kind indicated above is coupled, yielding a derivative material of still substantially higher molecular weight, by reaction of the starting material with a dibenzenesulfonyl, or other substituted diarylsulfonyl, diester of a diol containing 2 to 6 carbon atoms. In making diester coupling agents to be used in accordance with the practice of the present invention, any of various diols may be used. The simplest is, of course, ethylene glycol. Propylene glycol may be used as well; either 1,2-propylene glycol or 1,3-propylene glycol may be used. Diethylene glycol or triethylene glycol may likewise be reacted with benzenesulfonic acid or the like to produce, when proper proportions of materials are used, diesters which serve as coupling agents.

The invention is not necessarily limited to the use of diesters of such arylsulfonic acids. In some instances, appropriate results may be obtained with the use of triesters or tetraesters of still somewhat more highly functional organic alcohols, such as trimethylolpropane, glycerol, sorbitol, or glucose. In the Examples which follow, the use of the dibenzenesulfonic acid ester of triethylene glycol is illustrated, but in principle, there is no reason for not using a diester or triester of another one of the lower-carbon diols, triols, tetrols, etc., mentioned above.

After a suitable polyglycerol-based highly alkoxylated starting material has been made and properly dehydrated, it is possible to practice the present invention by adding a coupling agent of the kind indicated above under suitable conditions of temperature and with the use of proper proportions.

In respect to proportions, not much of the coupling agent is required to have a substantial effect upon the properties of the oxyalkylated polyglycerol. It is desirable, of course, to have the polyglycerol polyol, at the time that the coupling agent is added, suspended in a suitable solvent, such as xylene. Other suitable solvents include benzene, toluene, hexane, heptane, octane, cyclohexane, dioxane, and other relatively unreactive organic solvents. Depending upon the effect anticipated and upon the temperature at which the addition is effected, it will be desirable to use solvent in an amount of approximately one to five times the weight of the polyglycerol polyol starting material.

Moreover, in order to have a starting reaction mixture which can be handled, it is ordinarily necessary to operate, at the time of the addition of the coupling agent, with the temperature on the order of 100° C, although temperatures as low as 20° C or as high as 250° C may, in some circumstances, prove useful.

In respect to the proportion of the coupling agent, with respect to the polyglycerol polyol starting material, it is possible to obtain satisfactory results by adding on the order of 1 to 3 percent by weight of coupling agent, based upon the weight of the polyglycerol polyol starting material if the coupling agent is difunctional, and correspondingly less if it is of higher functionality.

Moreover, it is desirable to have present in the reaction mixture, when the addition of the coupling agent to the starting material is practiced, a modest catalytic proportion of an alkaline catalyst, such as sodium hydroxide or potassium hydroxide. An amount on the order of 1.5 to 3 percent by weight, based on the weight of the polyglycerol polyol starting material, is satisfactory. It is convenient to add the sodium hydroxide or potassium hydroxide in the form of an aqueous solution containing about 40 weight percent of the hydroxide, and when this is done, it is desirable, before adding the coupling agent, to subject the mixture of starting polyglycerol polyol, solvent, catalyst, and water to conditions of temperature and pressure which will cause the water to be removed, such as six hours under a nitrogen blanket at 100° C and atmospheric pressure.

The coupling agent to be added may itself also be dissolved in a suitably nonreactive solvent, such as benzene, toluene, or xylene.

It is desirable to add the coupling agent and its solvent under conditions of constant stirring. When the addition is made with the polyglycerol polyol starting material, solvent, and catalyst at about 100° C, a coupling reaction occurs within a relatively short period of time such as ½ to 4 minutes, yielding a material of substantially increased molecular weight.

The products so made may find use as hydrolubes (water-base lubricants which contain ingredients which increase viscosity and contribute to the lubricity of the composition), hydraulic fluids, hydrogels (hydrophilic water-swellable gels), replacements for various natural gums in various compositions, binding agents for bars composed of various surface-active agents, and the like.

The invention described above is further illustrated by the following specific Examples, which are to be taken as illustrative and not in a limiting sense.

EXAMPLE I

To a two-liter, four-necked flask having stirrer, nitrogen inlet, condenser, and azeotrope collector, there were added 10 grams (0.25 mol) of sodium hydroxide, dissolved in 15 grams of distilled water, 800 milliliters of xylene, and 360 grams of polyglycerol polyol starting material.

The polyglycerol polyol starting material was a product made by reacting a polyglycerol having an average of 5.4 glycerol units per molecule with a mixture of 85 weight percent ethylene oxide and 15 weight percent propylene oxide. The oxyalkylation of the polyglycerol was conducted in three stages, using in each stage of ratio of six parts by weight of the alkylene oxide per one part by weight of material containing glycerol units. Thus, the polyglycerol polyol starting material is itself a highly branched material of high molecular weight, containing under 1% of glycerol units. It was a semisolid at room temperature and had a molasses-like consistency at 80° to 100° C and a honeylike appearance. A 25 weight percent solution in deionized water had a viscosity of 568 Saybolt Universal Seconds at 100° F (37.8° C); a 15 weight percent solution, under similar conditions, had a viscosity of 123.7 Saybolt Universal Seconds.

The reaction mixture indicated above was heated at atmospheric pressure under a nitrogen blanket, with constant stirring, to a reflux temperature, and water was removed azeotropically. After a time of about six hours, the mixture was cooled, under a nitrogen blanket, to about 100° C.

Then 6.5 grams (0.0296 equivalent weight) of dibenzenesulfotriethylene glycol ester, dissolved in 50 milliliters of dry benzene, was added all at once. Stirring was maintained. After about 90 seconds, the product began to climb onto the stirrer, and it was transferred to a glass dish and dried under a vacuum of about 1 mm. of mercury absolute pressure at 110° to 120° C until the solvent was completely removed. A highly viscous resinous product was thus obtained. An aqueous solution containing 5 weight percent of the highly viscous resinous product was prepared. Brookfield viscosities were measured at 20° C with Spindle No. 2 for the aqueous solution. the results appear in the following table.

| Rate of Rotation, Revolutions/Minute | Viscosity, Centipoises |
| --- | --- |
| 2.5 | 112 |
| 5 | 112 |
| 10 | 104 |
| 20 | 98 |
| 50 | 93 |
| 100 | 96 |

EXAMPLE II

To a two-liter, four-necked flask having stirrer, nitrogen inlet, condenser, and azeotrope collector, there were added 10 grams (0.25 mol) of sodium hydroxide, dissolved in 15 grams of distilled water, 800 milliliters of xylene, and 360 grams of polyglycerol polyol starting material.

The polyglycerol polyol starting material was a product made by reacting a polyglycerol having an average of 17 glycerol inits with a mixture of 85 weight percent ethylene oxide and 15 weight percent propylene oxide. The oxyalkylation of the polyglycerol was conducted in three stages, using in each stage a ratio of six parts by weight of the alkylene oxide per one part by weight of material containing glycerol units. Thus, the polyglycerol polyol starting material is itself a highly branched material of high molecular weight, containing under 1% of glycerol units. In contrast to the procedure used in the making of the polyglycerol polyol used in the Example I, the concentration of alkali-metal hydroxide catalyst was somewhat greater (0.52 weight percent vs. 0.42 weight percent), and a product of about 18,500 average molecular weight was obtained after these three stages of oxyalkylation, as compared with 24,800 for the polyglycerol polyol (based upon 5.4-unit average polyglycerol) used in Example I.

The mixture indicated above was heated at atmospheric pressure under a nitrogen blanket, with constant stirring, to a reflux temperature, and water was removed azeotropically. After a time of about six hours, the mixture was cooled, under a nitrogen blanket, to about 100° C.

Then 7.4 grams (0.0344 equivalent weight) of dibenzenesulfotriethylene glycol ester, dissolved in 50 milliliters of dry benzene, were added all at once, at about 100° to 105° C. Stirring was maintained. After about 60 seconds, the product began to climb onto the stirrer, and it was transferred to a glass dish and dried under a vacuum of about 1 millimeter of mercury absolute pressure at 110° to 120° C until the solvent was completely removed. A highly viscous resinous product was thus obtained.

An aqueous solution containing five weight percent of the highly viscous resin was prepared. Brookfield Viscosities for the aqueous solution were measured at 20° C with Spindle No. 2. Results appear in the following table.

| Rate of Rotation, Revolutions/Minute | Viscosity, Centipoises |
|---|---|
| 2.5 | 80 |
| 5 | 72 |
| 10 | 72 |
| 20 | 72 |
| 50 | 73 |
| 100 | 82 |

While we have shown and described herein certain embodiments of our invention, we intend to cover as well any change or modification therein which may be made without departing from its spirit and scope.

The embodiments of the invention in which an exclusive property or the privilege is claimed are defined as follows:

1. A composition of matter comprising a mixture of compounds of the structural formula

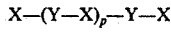

where X is the residue of a polyglycerol polyol with an M group removed, said polyglycerol polyol being a mixture of compounds of the formula

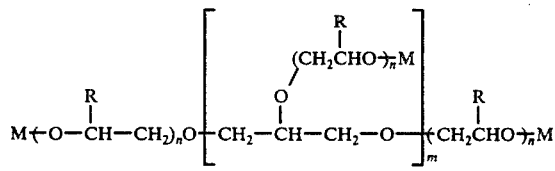

where
R is hydrogen or a methyl group and in which at least 75% of the R groups are hydrogen, M is hydrogen or an alkali metal, $m$ is an integer having an average value greater than 5, and $n$ is an integer having an average value high enough to provide a compound mixture having more than 95% alkylene oxide moieties,
Y is the residue of a diol containing 2 to 6 carbon atoms with two —OH groups removed therefrom, and
$p$ is an integer of 0 to 10 such that the molecular weight of the molecule exceeds 12,000, but not 50,000.

2. A method of producing a composition of matter comprising a mixture of compounds of the structural formula

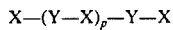

where X is the residue of a polyglycerol polyol with an M group removed, said polyglycerol polyol being a mixture of compounds of the structural formula

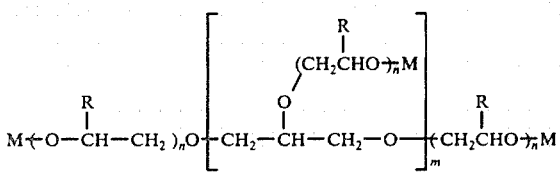

where
R is hydrogen or a methyl group and in which at least 75% of the R groups are hydrogen, M is hydrogen or an alkali metal, $m$ is an integer having an average value greater that 5, and $n$ is an integer having an average value high enough to provide a compound mixture having more than 95% alkylene oxide moieties,
Y is the residue of a diol containing 2 to 6 carbon atoms with two —OH groups removed therefrom, and
$p$ is an integer of 0 to 10 such that the molecular weight of the molecule exceeds 12,000, but not 50,000, said method comprising the steps of forming as a first solution an anhydrous, alkali-catalyzed solution of a starting material comprising a mixture of compounds having the structural formula defined above in an inert organic solvent,
forming a second anhydrous solution comprising a difunctional coupling agent selected from the group consisting of the benzenesulfonic and toluene acid diesters of diols containing 2 to 6 carbon atoms in an inert organic solvent, and
reacting said second solution with said first solution at a temperature from 20° to 250° C to obtain a coupled product having a molecular weight of over 12,000, but less than 50,000.

3. A method as defined in claim 2, wherein said coupling agent is the dibenzenesulfonic acid diester of triethylene glycol.

4. A method as defined in claim 3, wherein said starting material is a polyglycerol of about 5.4 glycerol units which has been oxyalkylated with an approximately 85:15 mixture by weight of ethylene oxide:propylene oxide to an average molecular weight of approximately 24,800.

5. A method as defined in claim 3, wherein said starting material is a polyglycerol of about 17 glycerol units which has been oxyalkylated with an approximately 85:15 mixture by weight of ethylene oxide:propylene oxide to an average molecular weight of approximately 18,500.

* * * * *